(12) United States Patent
Khawand et al.

(10) Patent No.: US 7,334,177 B2
(45) Date of Patent: Feb. 19, 2008

(54) METHOD AND SYSTEM FOR TRACKING SEQUENCE NUMBERS

(75) Inventors: Jean Khawand, Miami, FL (US); Joe Abourjeili, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 505 days.

(21) Appl. No.: 10/853,929

(22) Filed: May 26, 2004

(65) Prior Publication Data

US 2005/0268201 A1 Dec. 1, 2005

(51) Int. Cl.
*H04M 13/00* (2006.01)
(52) U.S. Cl. .............................. 714/752; 714/754
(58) Field of Classification Search .......... 714/752, 714/785, 758, 800, 751, 742; 370/394
See application file for complete search history.

(56) References Cited

U.S. PATENT DOCUMENTS

| | | | |
|---|---|---|---|
| 4,703,475 A * | 10/1987 | Dretzka et al. | 370/394 |
| 5,151,899 A * | 9/1992 | Thomas et al. | 370/394 |
| 6,134,237 A * | 10/2000 | Brailean et al. | 370/394 |
| 6,470,472 B1 * | 10/2002 | Johansson | 714/785 |
| 6,674,997 B2 * | 1/2004 | Hoctor | 455/108 |
| 7,010,607 B1 * | 3/2006 | Bunton | 709/228 |
| 2006/0112432 A1 * | 5/2006 | Daos et al. | 726/26 |

FOREIGN PATENT DOCUMENTS

| | | |
|---|---|---|
| EP | 1 089 257 A2 | 4/2001 |
| JP | 63187464 A | 8/1988 |
| JP | 63187471 A | 8/1988 |

* cited by examiner

*Primary Examiner*—Jacques Louis-Jacques
*Assistant Examiner*—Fritz Alphonse
(74) *Attorney, Agent, or Firm*—Larry G. Brown

(57) ABSTRACT

The invention concerns a method (500) for tracking sequence numbers. The method includes the steps of detecting (512) an error in a first set of data (120), determining (514) a range (144) of possible sequence numbers (122) for a second set of data (120) and using the range of possible sequence numbers, producing (516) a block code (126) for the second set of data in which the block code is used to verify that one of the range of possible sequence numbers is a correct sequence number for the second set of data.

23 Claims, 4 Drawing Sheets

METHOD AND SYSTEM FOR TRACKING SEQUENCE NUMBERS

BACKGROUND OF THE INVENTION

1. Field of the Invention

This invention relates in general to systems that process and transmit data and more particularly, to such systems that rely on sequence number tracking to perform such processing and transmission.

2. Description of the Related Art

Many wireless carriers now wish to install communications networks that can handle high-speed, packet data services. As an example, to target these wireless carriers, Motorola, Inc. of Schaumburg, Ill. has developed Wideband Integrated Digital Enhanced Network, or WiDEN. Typically, WIDEN can include up to four communications channels or carriers to transport data between a communications network and a mobile unit. As an example, an outbound reservation—a sequence of time slots containing data intended for a particular mobile unit—may be transmitted to the mobile unit from the network over the four carriers.

Generally, one of these time slots will include a header and the following time slots will contain extension blocks, which can carry data that is meant to be processed by the mobile unit. Each of these extension blocks may be assigned a sequence number, which increases by one for every extension block. For example, when the mobile unit receives a header, the mobile unit can initialize the extension block sequence number (EBSN) to zero and can increment by one the value of the EBSN each time that the mobile unit receives an extension block. The EBSNs can permit the mobile unit to verify that it has received the incoming data in a proper order.

To save bandwidth, the extension blocks are implicitly numbered with the EBSNs, which means that the EBSNs are incorporated into an error detection algorithm, such as cyclic redundancy code (CRC). As such, the mobile unit can verify the correct EBSN by performing a CRC calculation using the mobile unit's internal copy of the EBSN. Unfortunately, if one or more of the carriers fail for any particular reason, the CRC computation will fail, and the mobile unit will discard the data. That is, if the EBSN internal to the mobile unit becomes unsynchronized with the EBSN provided by the network, the mobile unit will not accept the transmitted data. In addition, the mobile unit will request that the network resend the sequence of time slots, beginning with the extension block where the carrier failure occurred. This process reduces the processing performance of the mobile unit, wastes valuable bandwidth and negatively affects battery life, particularly if the failure occurs at an extension block that is near the header.

SUMMARY OF THE INVENTION

The present invention concerns a method for tracking sequence numbers. The method includes the steps of detecting an error in a first set of data, determining a range of possible sequence numbers for a second set of data and using the range of possible sequence numbers, producing a block code for the second set of data. The block code is used to verify that one of the range of possible sequence numbers is a correct sequence number for the second set of data. The method can also include the step of determining whether the block code is a correct block code.

In one arrangement, the producing the block code for the second set of data step can include the step of computing the block code for each sequence number in the range of possible sequence numbers using a block code computing engine. The range of possible sequence numbers has a high end value and a low end value. In an alternative embodiment, the producing the block code for the second set of data step can include the steps of computing a block code for the low end value and if the block code for the low end value indicates that the low end value is not a correct sequence number, storing the block code for the low end value.

The alternative embodiment can also include the steps of—for a value in the range of possible sequence numbers that is subsequent to the low end value—determining a difference between the subsequent value and the low end value, referencing the difference between the subsequent value and the low end value against a table having predetermined values and selecting one of the predetermined values that corresponds to the difference between the subsequent value and the low end value. The selected predetermined value and the stored block code of the low end value can be combined to generate the block code that is used to verify that one of the range of possible sequence numbers is the correct sequence number.

The alternative embodiment can also include the step of determining whether the generated block code is the correct block code and if the generated block code fails, repeating the determining the difference, referencing the difference, selecting one of the predetermined values, combining the selected predetermined value with the stored block code and determining whether the generated block code is the correct block code steps until the correct block code is generated.

As an example, the determining the difference between the subsequent value and the low end value step can be performed using an exclusive OR operation. In addition, the combining the selected predetermined value with the stored block code of the low end value step can be performed using an exclusive OR operation.

As another example, the set of data can be an extension block, and the block code can be cyclic redundancy code. Also, the first and second sets of data can be extension blocks that are transmitted over one of a multiple number of carriers in a wireless communications network. In another arrangement, the error can be detected when a slot descriptor block cannot be decoded or when a block code for the first set of data fails computation.

The present invention also concerns a communication device for tracking sequence numbers. The communication device includes a block code computing section and a processor in which the block code detects an error in a first set of data. When the block code computing section signals the processor that the block code computing section has detected the error, the processor is programmed to determine a range of possible sequence numbers for a second set of data. Additionally, the block code computing section uses the range of possible sequence numbers to produce a block code for the second set of data. The processor is further programmed to use the block code to verify that one of the range of possible sequence numbers is a correct sequence number for the second set of data. The mobile unit can also include suitable software and/or circuitry to carry out the processes described above.

The present invention also concerns a machine readable storage, having stored thereon a computer program having a plurality of code sections executable by a portable computing device. The code sections cause the portable computing device to perform the steps of detecting an error in a first set of data, determining a range of possible sequence numbers for a second set of data and using the range of possible sequence numbers, producing a block code for the second set of data. The block code is used to verify that one of the range of possible sequence numbers is a correct sequence number for the second set of data. The code sections can also cause the portable computing device to perform the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
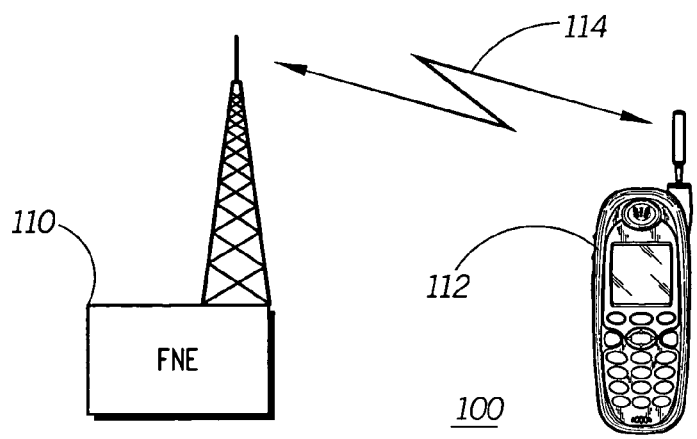
FIG. 1 illustrates a communications system in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, an example of a communications system 100 is shown. In this example, the communications system 100 can be a wireless communications system for facilitating wireless transmission of voice or data. As such, the communication system 100 can include fixed network equipment 110 and one or more communication devices 112, which, in this case, can be mobile units, such as a cellular telephone, a wireless laptop computer or a personal digital assistant, etc. The fixed network equipment 110 (FNE) can be any suitable type of communications equipment for facilitating communications with the communication device 112, such as a base station and its supporting equipment.

The FNE 110 can transmit data (including voice) over a wireless communications link 114 to the communication device 112. In accordance with an embodiment of the inventive arrangements, sequence numbers can be assigned to the data. If, for whatever reason, the data becomes corrupted, the communication device 112 can detect an error in this data. Because of the error, the sequence numbers that the communication device 112 assigns to the data may be inaccurate, at least in comparison to the sequence numbers generated by the FNE 110. In response, the communication device 112 can determine a range of possible sequence numbers for the data. Using the range of possible sequence numbers, the communications device 112 can then produce a block code for the data in which the communication device 112 uses the block code to verify that one of the range of possible sequence numbers is a correct sequence number for the data. The correct sequence number can then be assigned to the data.

As such, the communication device 112 can synchronize its internal sequence numbers with the sequence numbers generated by the FNE 110 without requesting that the FNE 110 retransmit the data. This process can also eliminate the need to explicitly imbed sequence numbers into the transmitted data. Examples of this process will be presented below. In particular, one process will be described that is optimal for avoiding degradation in the performance of the communication device 112 in carrying out the invention. Although the invention will mainly be described in terms of a wireless communications system, those of skill in the art will appreciate that the invention can be practiced in virtually any system in which data is transmitted between two or more locations where the system relies on sequence numbers to ensure the proper transfer of data.

Figure 2:
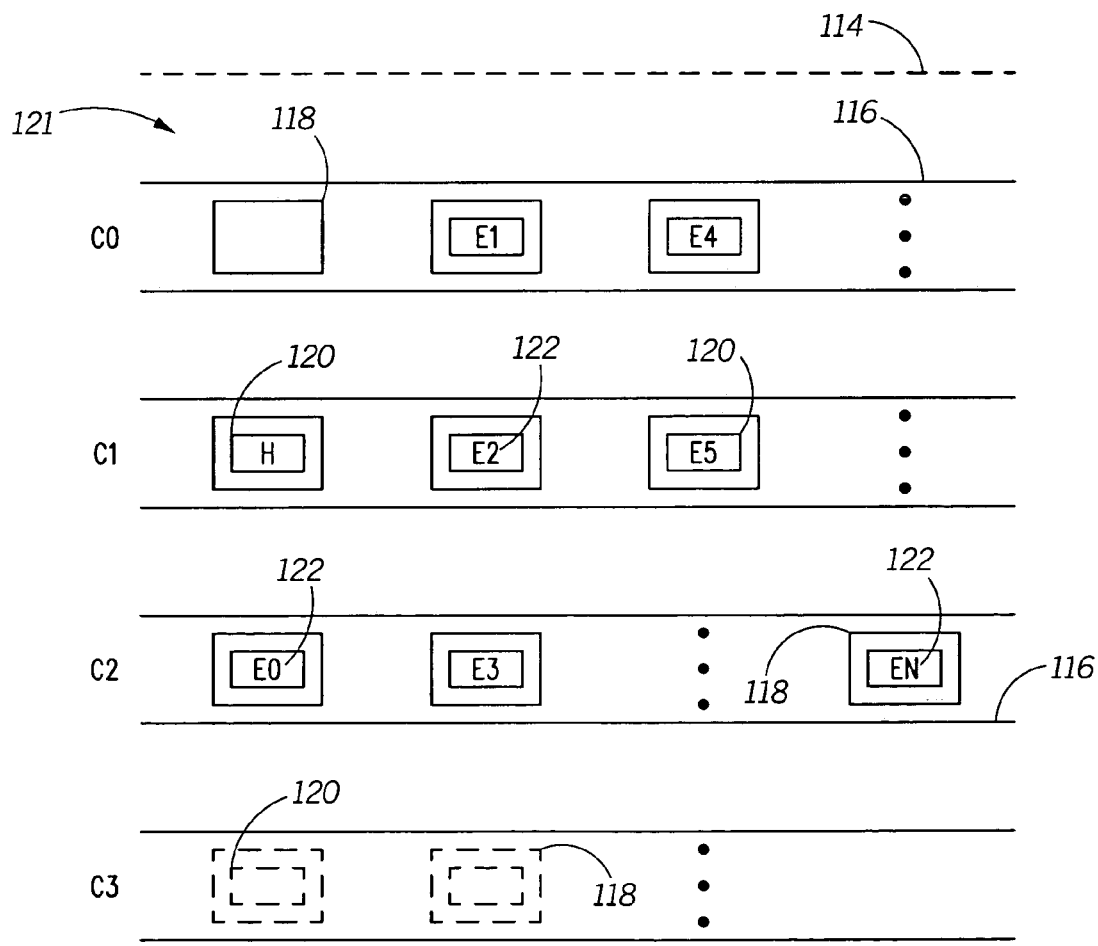
FIG. 2 illustrates number of carriers used to transport data in the communications system of FIG. 1 in accordance with an embodiment of the inventive arrangements.

Referring to FIG. 2 an example of the wireless communications link 114 is shown. In this example, the wireless communications link 114 can include one or more channels or carriers 116, and each of these carriers 116 can be used to transmit data from the FNE 110 to the communication device 112 (see FIG. 1). For purposes of the invention, the term data can include any suitable type of information that is capable of being transmitted either over a wireless communications link or a hard-wired communications link. Although four carriers 116 are shown in FIG. 2, the invention by no means is limited to this particular number of carriers 116. To better explain the operation of the invention, the carriers 116 in FIG. 2 will be referred to as carriers $C_0$, $C_1$, $C_2$ and $C_3$.

In one particular arrangement, each of the carriers 116 can carry time slots 118. Although a time-based communications system will be used to describe the invention, it must be stressed that the invention is not limited in this regard. Those of ordinary skill in the art will appreciate that the invention can be practiced in systems using other suitable transmission protocols. These time slots 118 can include sets of data 120, which are intended to be transmitted to a particular communication device. In another arrangement, the set of data 120 can be either a header (designated by the reference letter "H") or an extension block (designated by the reference letter "E").

As an example, referring to both FIGS. 1 and 2, the sets of data 120 can be an outbound reservation 121 that contains data that is transmitted from the FNE 110 and is targeted to the communication device 112. To process this data, the communication device 112 can maintain sequence numbers for each of the sets of data 120. That is, the sets of data 120 may not have explicit sequence numbers embedded within them, and the communication device 112 may keep track of the sets of data 120 by maintaining its own internal count of the sequence numbers.

Several sequence numbers, designated by the reference number 122 (see FIG. 2), are shown assigned to the sets of data 120. These sequence numbers 122 can be the sequence numbers 122 that the communication device 112 assigns to the sets of data 120. As such, these sequence numbers 122 may be referred to as internal sequence numbers 122. The sequence numbers may also be referred to as extension block sequence numbers 122, although they are not limited to that particular form. In this example, the first set of data 120 intended for the communication device 112 can be a header H. A predetermined number of sets of data 120 can follow the header H, and these can be extension blocks E. The first extension block E can be assigned an internal sequence number 122 of 0, and the communication device 112 can increase this value by one for each successive extension block E that it receives until the outbound reservation 121 is complete.

Figure 3:
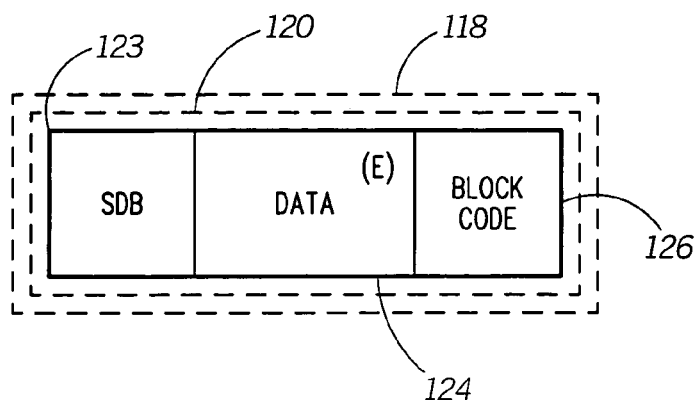
FIG. 3 illustrates an example of a time slot in accordance with an embodiment of the inventive arrangements.

Referring to FIG. 3, an example of a time slot 118 is shown. Here, the time slot 118 can include a slot descriptor block 123 (SDB) and a set of data 120 having data 124 and block code 126. The set of data 120 can be an extension block E. As is known in the art, SDB 123 or the block code 126 can be used to help the communication device 112 (see FIG. 1) detect transmission errors, i.e., that there may be an error in the transmitted data. As an example, the block code 126 can be cyclic redundancy code (CRC), although the block code 126 can be any suitable code, procedure or algorithm that can be used to detect errors in the transmitted data 124.

Referring to FIGS. 1-3, when transmitting the outbound reservation 121 to the communication device 112, the FNE 110 can generate its own sequence numbers, which can be referred to as FNE sequence numbers. To save bandwidth, these FNE sequence numbers can be part of the block code 126. This process preserves bandwidth because the FNE sequence numbers are not part of the data 124 carried by the sets of data 120. When the communication device 112 receives the outbound reservation 121 and detects the header H, the communication device 112 can set its internal sequence number 122 to a value of zero, which can be assigned to the first extension block E. As noted earlier, for each successive extension block E, the communication device 122 can increase by one the value of the internal sequence number 122. For example, the extension block E in the first time slot 118 of the carrier $C_2$ can be assigned a sequence number of zero. In addition, the next extension block E, which can be in the second time slot 118 in the carrier $C_0$, can be assigned a sequence number of one (this process assumes that the set of data 120 in the first time slot 118 in the $C_3$ carrier is not intended for the communication device 112).

When the communication device 112 processes the SDB 123 or the block code 126, it may detect an error. In view of this error, the internal sequence number 122 may not match the FNE sequence number. For example, one of the carriers 116, such as the $C_3$ carrier, may fail (the time slots 118 and the sets of data 120 are shown with broken outlines to indicate this scenario). In this case, the communication device 112 has no way of determining whether an extension block E that it was intended to receive was on the $C_3$ carrier.

If no corrective action is taken, the communication device 112 may assume that such an extension block E was present on the $C_3$ carrier in the relevant time slot 118. As a result, the communication device 112 may assign the next extension block E in the $C_0$ carrier with a sequence number 122 of two. When the block code 126 of this particular extension block E is processed, the block code 126 will fail. The communication device 112 can determine that the internal sequence number 122 does not match the FNE sequence number. Accordingly, the communication device 112 may not be able to process any subsequent extension blocks E.

Figure 4:
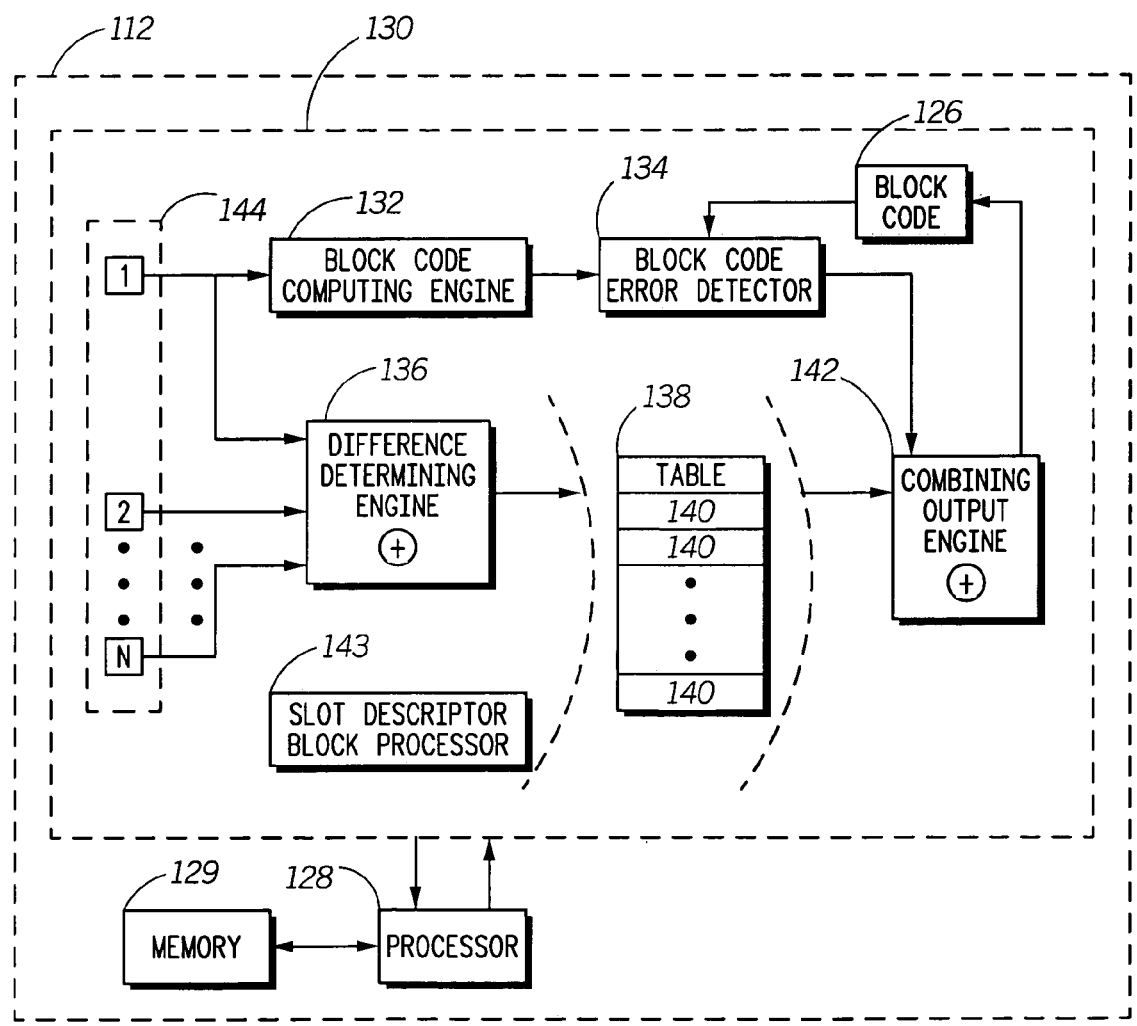
FIG. 4 illustrates an example of a communication device for tracking sequence numbers in accordance with an embodiment of the inventive arrangements.

Referring to FIG. 4, an example of a communication device 112 that can help resynchronize the internal sequence numbers 122 and the FNE sequence numbers is shown. This resynchronization process can enable the communication device 112 to process the remaining extension blocks E without having to embed the extension blocks E with explicit sequence numbers or without requesting that the FNE 110 (see FIG. 1) resend any extension blocks E.

In one arrangement, the communication device 112 can include a processor 128, a memory 129 to which the processor may be coupled and a block code computing section 130. The block code computing section 130 can include several elements, and the processor 128 may be coupled to or communicate with several of these elements. In one arrangement, the block code computing section 130 can have a block code computing engine 132, a block code error detector 134, a difference determining engine 136 and a table 138 including any number of predetermined values 140. The block code computing section 130 can also include a combining output engine 142 and a slot descriptor block processor 143. Each of the components cited above can be comprised of any suitable type of hardware and/or software to perform their functions, each of which will be described below.

Figure 5:
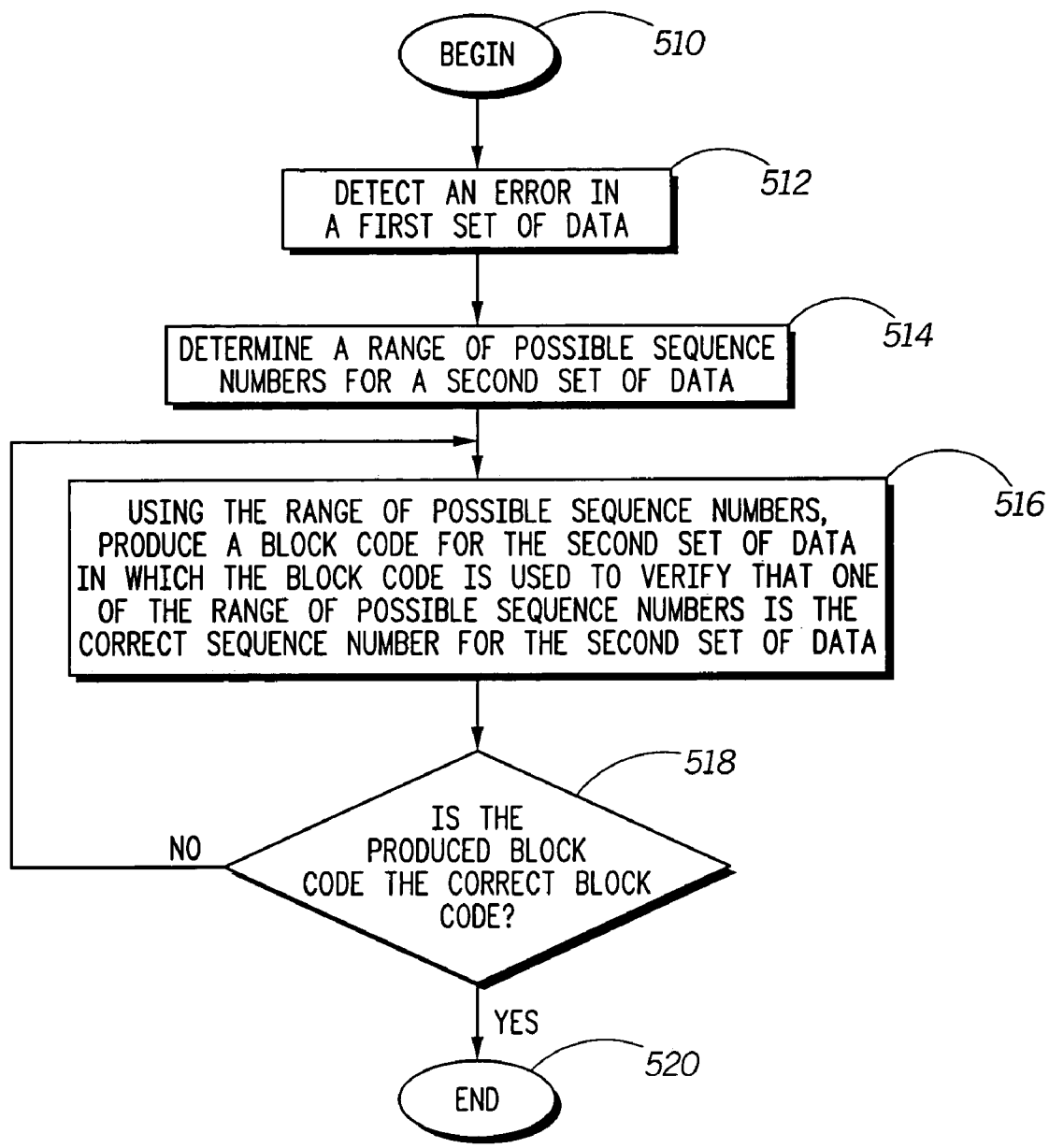
FIG. 5 illustrates a method of tracking sequence numbers in accordance with an embodiment of the inventive arrangements.

Referring to FIG. 5, a method 500 for tracking sequence numbers is illustrated. To describe the method 500, reference will be made to FIGS. 1-4, although it is understood that the invention can be practiced in any other suitable system used to transport any form of data. In particular, an example will be described in which the $C_3$ carrier of FIG. 2 fails and in which the communication device 112 is able to resynchronize its internal sequence numbers 122 with the FNE sequence numbers.

At step 510, the method 500 can begin. At step 512, an error in a first set of data can be detected. Additionally, a range of possible sequence numbers for a second set of data can be determined, as shown at step 516. For example, referring to FIGS. 1-4, the $C_3$ carrier may fail, and the set of data 120 in the first time slot 118 of the $C_3$ carrier, which can be referred to as a first set of data 120, may not be properly processed. As an example, the slot descriptor block processor 143 may detect the error in the first set of data 120 if the slot descriptor block 123 cannot be decoded properly. Alternatively, the block code error detector 134 can detect an error when the block code computing engine 132 computes the block code 126 for the first set of data 120 and the computation fails.

At this point, the communication device 112 is unable to determine whether the first set of data 120 was intended for receipt by the communication device 112. The processor 128 can then determine a range 144 of possible sequence numbers 122 for, as an example, the next available set of data 120 in a carrier 116 that is not affected by a failure. This set of data 120 can be referred to as a second set of data 120. In this example, the second set of data 120 can be the set of data 120 that is in the second time slot 118 in the $C_0$ carrier.

In one arrangement, the range 144 of possible sequence numbers 122 can include a high end value and a low end value, and these values can be associated with the second set of data 120. The range 144 of possible sequence numbers 122 can include any suitable number of sequence numbers 122, all the way to a value of N. Specifically, the high end value, given the circumstances of the failure, can be the highest possible value that can be assigned to the second set of data 120. Similarly, the low end value can be the lowest possible value possible for the second set of data 120. In this example, the second set of data 120 can have a high end value of two and a low end value of one. That is, the highest possible sequence number 122 for this particular second set of data 120 has a value of two, and the lowest possible sequence number 122 has a value of one.

As another example, consider the additional failure of the $C_0$ carrier. Here, the second set of data 120 can be the set of data 120 in the second time slot 118 of the $C_1$ carrier. Accordingly, the high end value for the second set of data 120 can now have a value of three, while the low end value can remain at one. This range 144 can also have a possible value of two, which is between the high and low end values. Any value for a possible sequence number 122 for the second set of data that is above the low end value can be referred to as a subsequent value.

Referring back to FIG. 5, at step 516, using the range of possible sequence numbers, a block code can be produced for the second set of data. This block code can be used to verify that one of the range of possible sequence numbers is the correct sequence number for the second set of data. At decision block 518, it can be determined whether the produced block code is the correct block code. If it is, the method 500 can end at step 520. If it is not, the method 500 can resume at step 516.

Figure 6:
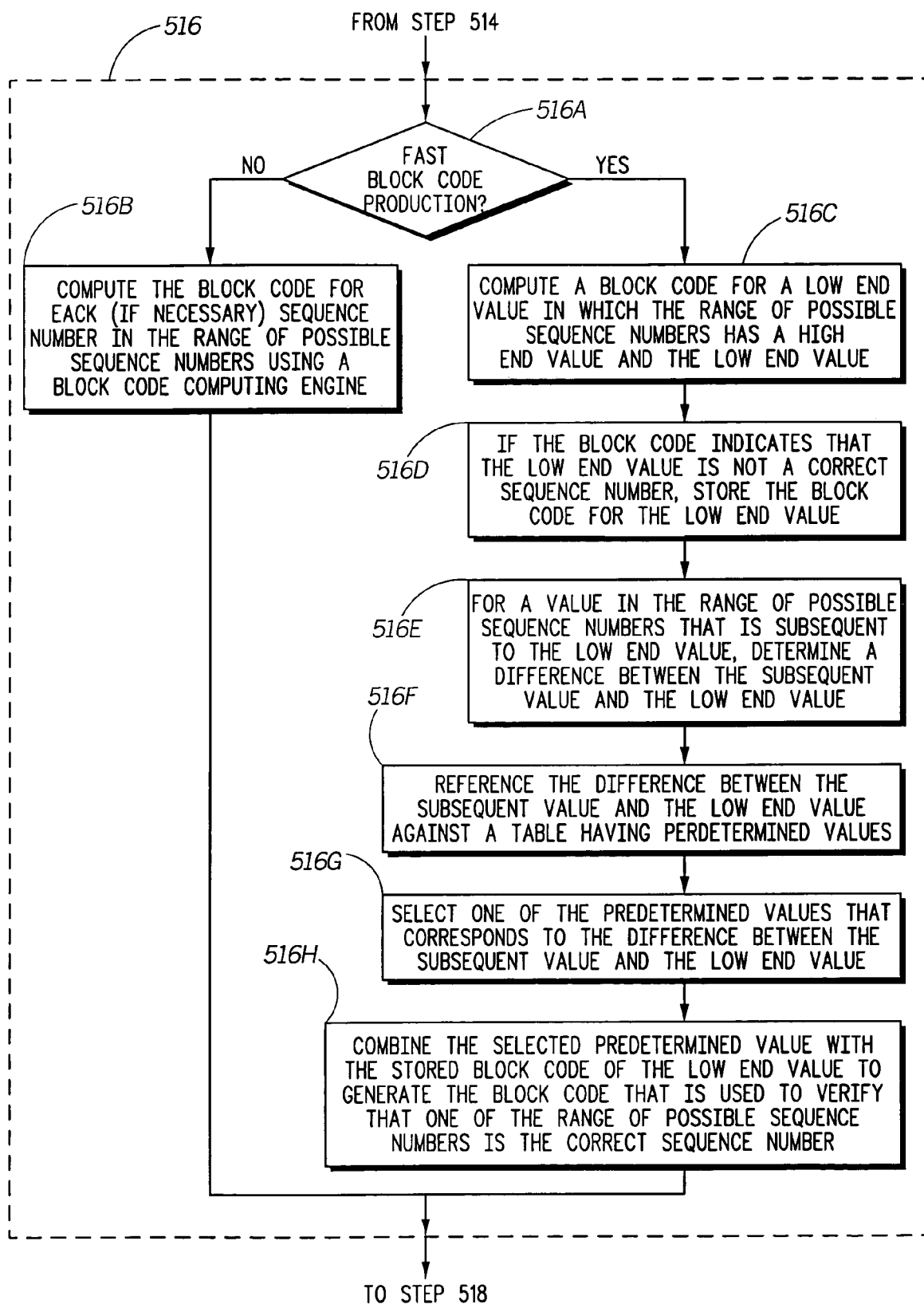
FIG. 6 illustrates a portion of a step in the method of FIG. 5 in accordance with an embodiment of the inventive arrangements.

There are several ways to produce this block code for the second set of data. Referring to FIG. 6, several steps that can be part of step 516 of FIG. 5 are shown, and these steps present two ways to produce the block code. The first process can be referred to as an intensive block code production, and the second process can be referred to as a fast block code production. Either process is appropriate for purposes of the invention, although it must be noted that any other suitable procedure for producing the block code of the second set of data can be employed. In the description below, the terms "compute" and "generate" will be used to describe the process of producing block code.

When referring to computing block code, the step of using the block code computing engine 132 to produce the block code is applicable. When referring to generating block code, the process of using the difference determining engine 136, the table 138 and the combining output engine 142 to produce the block code is applicable. Using this differentiating language can help distinguish between the two processes for producing block code.

At decision block 516A of FIG. 6, it can be determined whether fast block code production will be employed. If not, at step 516B, the block code can be computed for each sequence number (if necessary) in the range of possible sequence numbers using a block code computing engine. To illustrate an example of this process, the scenario described above in which the $C_3$ carrier has failed and the high and low end values of possible sequence numbers 122 for the second set of data 120 are two and one, respectively, will be used.

To compute the block code 126, the block code computing engine 132 will compute a block code 126 in which the internal sequence number 122 for the second set of data 120 is one. It may also be necessary for the block code computing engine 132 to compute the block code 126 in which the internal sequence number 122 for the second set of data is two. For example, assume the first time slot 118 in the $C_3$ carrier was not intended for the communication device 112. The block code computing engine 132 can compute the block code 126 using the low end sequence value of one, and the block code error detector 134 can determine that the block code 126 has passed. In this example, it is not necessary to compute a block code 126 for the high end value of two. This result occurs because the second set of data 120 in this case was originally intended to have a sequence number of one.

Conversely, the first time slot 118 may have been intended for receipt by the communication device 112. As a result, when the block code computing engine 132 computes the block code 126 for the low end value of one, the block code error detector 134 can determine that the block code 126 has failed. The block code computing engine 132 can then compute the block code 126 for the high end value of two, and the block code error detector 134 can determine that the block code 126 is acceptable and can signal the processor 128. Thus, the processor 128 can determine that the sequence number 122 from the range 144—in this case, the value two—is correct. Moreover, the processor 128 can assign to the second set of data 120 a sequence number 122 of two, which it was initially intended to have. The sets of data 120 that follow the second set of data 120 can now be processed (this process may have to be repeated if the $C_3$ carrier remains out of operation if and when the communication device 112 is ready to again process time slots 118 from the $C_3$ carrier).

This process can occur for all the sequence numbers 122 in the range 144 of possible sequence numbers. In other words, the block code computing engine 132 can compute the block code 126 for each sequence number 122 in the range 144 of possible sequence numbers 122 until the correct block code 126 is located.

Referring back to the decision block 516A, if the fast block code production is chosen, then at step 516C, a block code can be computed for a low end value of the range. At step 516D, if the block code indicates that the low end value is not a correct sequence number, the block code for the low end value can be stored.

For example, referring to FIGS. 1-4 again and relying on the previous example in which the $C_3$ carrier fails, the block code computing engine 132 can compute the block code 126 for the low end value sequence number 122, which is one in this case. This process is similar to the example described above. If the block code error detector 134 determines that the block code 126 computed for the low end value is correct, the processor 128 can assign the second set of data 120 a sequence number 122 having a value of one. Any subsequent sets of data 120 can now be processed.

If the block code error detector 134 determines that the block code 126 for the low end value of the possible sequence numbers 122 has failed, the block code error detector 134 can signal the processor 128. In response, the processor 128 can store the block code 126 for the low end value (one, in this example) in the memory 129. The stored block code 126 for the low end value can be used to help generate additional block codes for the other sequence number 122 values in the range 122, as will be explained later.

Referring back to FIG. 6, at step 516E, for a value in the range of possible sequence numbers that is subsequent to the low end value, a difference between the subsequent value and the low end value can be determined. In addition, at step 516F, the difference between the subsequent value and the low end value can be referenced against a table having predetermined values. One of the predetermined values that corresponds to the difference between the subsequent value and the low end value can be selected, as shown at step 516G. At step 516H, the selected, predetermined value and the stored block code of the low end value can be combined. This step can generate the block code that can be used to verify that one of the range of the possible sequence numbers is the correct sequence number. The method 500 can then resume at decision block 518 of FIG. 5, where it can be determined whether the produced, i.e., generated, block code is the correct block code.

Referring once again to FIGS. 1-4, the processor 128 can direct one of the values in the range 144 of possible sequence numbers 122 to the difference determining engine 136. This value of possible sequence number 122 can be subsequent to the low end value; it may be the high end value or any other value that follows the low end value. The processor 128 can also feed the value for the low end sequence number 122 to the difference determining engine 136. In accordance with the example that has been used, the subsequent value can be a sequence number 122 having a value of two. In one arrangement, these two values, the subsequent value and the low end value, can be binary numbers, and the difference determining engine 136 can perform an exclusive OR operation to determine the difference between the subsequent value and the low end value.

Once determined, the processor 128 can then reference the difference between the subsequent value and the low end value against the table 138 having the predetermined values 140. The processor 128 can then select one of the predetermined values 140 that corresponds to the difference between the subsequent value and the low end value. In one arrangement, the predetermined values 140 can be generated by finding the difference between all the possible values of sequence numbers 122 and computing a block code 126 for each difference. This predetermined block code 126 can be a CRC or any other linear transfer function.

As an example, the number of sequence numbers 121 in a typical outbound reservation 121 may be known. Prior to transmission of the outbound reservation 121, the difference between the values of each of these sequence numbers 122 can be determined. The difference can be determined by using, for example, an exclusive OR function. Subsequently, the CRC or any other linear transfer function can be applied to these differences, thereby producing the predetermined values 140. Each of these predetermined values 140 can correspond to a difference that was used to produce a particular predetermined value 140. Of course, the above description is merely one example of generating predetermined values 140 for the table 138, as those of skill in the art will appreciate that many other processes can be used to calculate or select predetermined values 140 for the table 138.

After it selects the predetermined value 140 that corresponds to the difference, the processor 128 can feed the predetermined value 140 into the combining output engine 142. In addition, the processor 128 can retrieve from the memory 129 the computed block code 126 for the low end value (computed in step 516C) and can transfer it to the combining output engine 142.

In one arrangement, the combining output engine 142 can combine the selected predetermined value 140 and the block code 126 for the low end value using an exclusive OR function. In doing so, the combining output engine 142 can generate a block code 126 (see also FIG. 4) that can be used to verify that one of the range 144 of possible sequence numbers 122 is the correct sequence number 122. For example, the processor 128 can direct the generated block code 126 to the block code error detector 134 (see also decision block 518 of FIG. 5). If it passes, the processor 128 can determine that the sequence number 122 from the range 144 that it used to generate this block code 126—in this case, the value two—is the correct sequence number 122 for the second set of data 120. The processor 128 can then assign the correct sequence number 122 to the second set of data 120.

The process described in relation to steps 516D-H can be used to produce a correct block code 126 without the need to compute a block code 126 for each possible sequence number 122 in the range 144 using the block code computing engine 132. Using the block code computing engine 132 to compute block code 126 may take up valuable processing power. As a result, this fast block code production method can increase the efficiency of the communication device 112.

As explained earlier in reference to FIG. 5, if the computed or generated block code 126 is not the correct block code 126, the method 500 can resume at step 516. For example, referring to FIGS. 2, 4 and 6, if the process described in step 516B was employed and the computed block code 126 is not the correct block code 126, another block code 126 can be computed for the next successive, subsequent value in the range 144 of possible sequence numbers 122. Specifically, the block code computing engine 132 can compute another block code 126 for the next value after the value that was just previously processed. This process can continue until the correct block code 126 is determined, which may or may not end with the high end value.

Similarly, if the process described in steps 516C-H was employed, the determining the difference step 516E, the referencing the difference step 516F, the selecting one of the predetermined values step 516G, the combining the selected predetermined value with the stored block code step 516H and the determining whether the generated block code is the correct block code step 518 (see FIG. 5) can all be repeated. This repetition can occur for each of the values of the range 144 of possible sequence numbers 122 until the correct block code 126 is determined.

Although the above-described repetition process was not necessary in the example discussed above, it can be useful if the range 144 has more than two values. For example, consider the range 144 having three values of possible sequence numbers 122—a low end value of one, a subsequent value of two and a high end value of three—in which the high end value of three is the correct sequence number 122. The repletion of the above-referenced steps can continue until it is determined that the high end value of three produces a properly generated block code 126.

Once it is determined that the produced block code 126 is the correct block code 126 in accordance with the procedures above, the communication device 112 can determine that the sequence number 122 that produced the correct block code 126 should be assigned to the second set of data 120. Accordingly, the sequence number 122 assigned to the second set of data 120 can match the FNE sequence number 122. The communication device 112 can then proceed to process any subsequent sets of data 120. If another carrier 116 develops a problem or if the previously malfunctioning carrier 116 remains affected, the methods described above can be repeated to resynchronize the sequence numbers 122.

It must be understood that the invention is not limited to the processes illustrated above when producing block code 126 for a set of data 120. Any other suitable method for producing a block code 126 can be employed. Also, the range 144 of sequence numbers 122 can include any suitable number of values. In addition, while the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for tracking sequence numbers, comprising the steps of:
    detecting an error in a first set of data;
    in response to detecting the error, determining a range of possible sequence numbers for a second set of data;
    using the range of possible sequence numbers, producing a block code for the second set of data, wherein the block code is used to verify that one of the range of possible sequence numbers is a correct sequence number for the second set of data;
    determining whether the block code is a correct block code; and
    computing the block code for each sequence number in the range of possible sequence numbers using a block code computing engine.

2. The method according to claim 1, wherein the range of possible sequence numbers has a high end value and a low end value and the producing the block code for the second set of data step comprises:
    computing a block code for the low end value; and
    if the block code for the low end value indicates that the low end value is not a correct sequence number, storing the block code for the low end value.

3. The method according to claim 2, wherein the producing the block code for the second set of data step further comprises:
    for a value in the range of possible sequence numbers that is subsequent to the low end value, determining a difference between the subsequent value and the low end value;
    referencing the difference between the subsequent value and the low end value against a table having predetermined values;
    selecting one of the predetermined values that corresponds to the difference between the subsequent value and the low end value; and
    combining the selected predetermined value with the stored block code of the low end value to generate the block code that is used to verify that one of the range of possible sequence numbers is the correct sequence number.

4. The method according to claim 3, wherein the producing the block code for the second set of data step further comprises:
    determining whether the generated block code is the correct block code; and
    if the generated block code fails, repeating the determining the difference, referencing the difference, selecting one of the predetermined values, combining the selected predetermined value with the stored block code and determining whether the generated block code is the correct block code steps until the correct block code is generated.

5. The method according to claim 3, wherein the determining the difference between the subsequent value and the low end value step is performed using an exclusive OR operation.

6. The method according to claim 3, wherein the combining the selected predetermined value with the stored block code of the low end value step is performed using an exclusive OR operation.

7. The method according to claim 1, wherein the set of data is an extension block and wherein the block code is cyclic redundancy code.

8. The method according to claim 1, wherein the first and second sets of data are extension blocks that are transmitted over one of a multiple number of carriers in a wireless communications network.

9. The method according to claim 1, wherein the error is detected when a slot descriptor block cannot be decoded or when a block code for the first set of data fails computation.

10. A communication device for tracking sequence numbers, comprising:
    a block code computing section, wherein the block code detects an error in a first set of data;
    a processor, wherein when the block code computing section signals the processor that the block code computing section has detected the error, the processor is programmed to determine a range of possible sequence numbers for a second set of data;
    wherein the block code computing section uses the range of possible sequence numbers to produce a block code for the second set of data and the processor is further programmed to use the block code to verify that one of the range of possible sequence numbers is a correct sequence number for the second set of data; and
    wherein the block code computing section has a block code error detector, wherein the block code error detector detects the error in the first set of data, signals the processor that the block code error detector has detected the error and determines whether the block code is a correct block code.

11. The communication device according to claim 10, wherein the block code computing section includes a block code computing engine, wherein the block code computing engine computes the block code for each sequence number in the range of possible sequence numbers.

12. The communication device according to claim 10, wherein the range of possible sequence numbers has a high end value and a low end value and the block code computing section further includes a block code computing engine, a block code error detector and a memory;
    wherein the block code computing engine computes a block code for the low end value and the block code error detector determines whether the block code for the low end value is correct and if the block code for the low end value is not correct, the processor is further programmed to store in the memory the block code for the low end value.

13. The communication device according to claim 12, wherein the block code computing section further includes a difference determining engine, a table having predetermined values and a combining output engine;
wherein, for a value in the range of possible sequence numbers that is subsequent to the low end value, the difference computing engine determines a difference between the subsequent value and the low end value;
wherein the processor is further programmed to reference the difference against the table of predetermined values and to select one of the predetermined values that corresponds to the difference between the subsequent value and the low end value;
wherein the combining output engine combines the selected predetermined value with the stored block code of the low end value to generate the block code that the processor is programmed to use to verify that one of the range of possible sequence numbers is the correct sequence number.

14. The communication device according to claim 13, wherein the block code error detector determines whether the generated block code is the correct block code;
wherein if the generated block code fails, the difference computing engine, the processor, the combining output engine and the block code error detector will repeat each of their respective functions until the correct block code is generated.

15. The communication device according to claim 13, wherein the difference determining engine performs an exclusive OR function.

16. The communication device according to claim 13, wherein the combining output engine performs an exclusive OR operation.

17. The communication device according to claim 10, wherein the set of data is an extension block and wherein the block code is a cyclic redundancy code.

18. The communication device according to claim 10, wherein the communication device is a mobile unit and wherein the first and second sets of data are extension blocks that are transmitted over one of a multiple number of carriers in a wireless communications network.

19. The communication device according to claim 10, wherein the block code computing section detects the error when a slot descriptor block cannot be decoded or when a block code for the first set of data fails computation.

20. A machine readable storage, having stored thereon a computer program having a plurality of code sections executable by a portable computing device for causing the portable computing device to perform the steps of:
detecting an error in a first set of data;
in response to detecting the error, determining a range of possible sequence numbers for a second set of data;
using the range of possible sequence numbers, producing a block code for the second set of data, wherein the block code is used to verify that one of the range of possible sequence numbers is a correct sequence number for the second set of data;
determining whether the block code is a correct block code; and computing the block code for each sequence number in the range of possible sequence numbers using a block code computing engine.

21. The machine readable storage according to claim 20, wherein the range of possible sequence numbers has a high end value and a low end value and the plurality of code sections executable by the portable computing device further cause the portable computing device to perform the producing the block code for the second set of data by:
computing a block code for the low end value; and
if the block code indicates that the low end value is not a correct sequence number, storing the block code for the low end value.

22. The machine readable storage according to claim 21, wherein the plurality of code sections executable by the portable computing device further cause the portable computing device to perform the producing the block code for the second set of data by:
for a value in the range of possible sequence numbers that is subsequent to the low end value, determining a difference between the subsequent value and the low end value;
referencing the difference between the subsequent value and the low end value against a table having predetermined values;
selecting one of the predetermined values that corresponds to the difference between the subsequent value and the low end value; and
combining the selected predetermined value with the stored block code of the low end value to generate the block code that is used to verify that one of the range of possible sequence numbers is the correct sequence number.

23. The machine readable storage according to claim 22, wherein the plurality of code sections executable by the portable computing device further cause the portable computing device to perform the producing the block code for the second set of data by:
determining whether the generated block code is the correct block code; and
if the generated block code fails, repeating the determining the difference, referencing the difference, selecting one of the predetermined values, combining the selected predetermined value with the stored block code and determining whether the generated block code is the correct block code steps until the correct block code is generated.

* * * * *